Aug. 18, 1970    J. HENRY-BAUDOT    3,525,007
AXIAL AIR-GAP MACHINES HAVING MEANS TO REDUCE EDDY
CURRENT LOSSES IN THE ARMATURE WINDINGS
Filed Aug. 15, 1968                                2 Sheets-Sheet 1

INVENTOR
Jacques Henry-Baudot
Kenyon, Kenyon & Estabrook
ATTORNEYS

Aug. 18, 1970    J. HENRY-BAUDOT    3,525,007
AXIAL AIR-GAP MACHINES HAVING MEANS TO REDUCE EDDY
CURRENT LOSSES IN THE ARMATURE WINDINGS
Filed Aug. 15, 1968    2 Sheets-Sheet 2

INVENTOR
Jacques Henry-Baudot
Kemon, Palmer & Estabrook
ATTORNEYS

United States Patent Office 3,525,007
Patented Aug. 18, 1970

3,525,007
AXIAL AIR-GAP MACHINES HAVING MEANS TO REDUCE EDDY CURRENT LOSSES IN THE ARMATURE WINDINGS
Jacques Henry-Baudot, Antony, France, assignor, by mesne assignments, to Photocircuits Corporation, Glen Cove, N.Y., a corporation of New York
Filed Aug. 15, 1968, Ser. No. 752,839
Claims priority, application France, Aug. 25, 1967, 119,128
Int. Cl. H02k 1/06
U.S. Cl. 310—268                        10 Claims

ABSTRACT OF THE DISCLOSURE

Electrical rotating machines having a lamellar conductor armature within an air-gap comprised of magnetic field zones of alternate denominations as generated by two sets of lumped magnetic pieces ensuring a spreading of the magnetic fringes at locations of said zones whereat the lamellar conductors come in and out during rotation, consequently importantly reducing the generation of eddy currents in said lamellar conductors.

SUMMARY

The invention concerns improvements in or relating to electrical rotating machines of the kind wherein the windings are made of lamellar conductors arranged in at least two layers of half-turn segments which are interconnected by their registering ends from layer to layer.

In such machines, the winding conductors are submitted to the action of magnetic fields from an inductor structure. In addition to the useful interaction between said conductors and said fields, eddy currents are generated in the conductors as their width is not negligible in the direction of relative movement of the winding with respect to said inductor magnetic fields. Eddy current losses may become highly deleterious to the efficiency of the machines.

It is an object of the invention to provide such machines with an inductor structure whereby an important decrease of the eddy current generation in the lamellar conductors of the winding is obtained without imposing any restriction to the winding arrangement proper and to the lamellar conductors themselves, as well in shape as in number.

Eddy current generation is a dynamic phenomenon due to the movement of a non-negligible width conductor in a magnetic field of which it cuts the lines of force; the importance of this phenomenon is the greater as the gradient of the magnetic field is of quicker variation. In conventional inductor structures for the kind of machines concerned by the invention, any lamellar conductor quickly moves from a low magnetic induction zone to a high magnetic induction zone and conversely as said conductor passes from a zone between two successive pole pieces to a zone under a pole piece and escapes in a further zone between the said pole piece and the further pole piece (of opposite denomination, of course) in the arrangement of said pole pieces in the inductor structure. It is so because, in such conventional structures, the main factor to consider was thought to be as high a concentration of the magnetic field as possible for obtaining as high a magnetic induction as possible under any pole piece. Consequently, the magnetic field fringes at the edges of such pieces are as restricted as possible which, in counterpart, entails a very steep variation of the gradient of said field and, when lamellar conductors are used in the armature winding, high intensity eddy current generation.

According to the present invention, and in contradistinction with usual practice, it is provided to ensure the spreading of such magneteic field fringes to such an amount that, on the first part, the field gradient varies in a relatively smooth fashion, hence an important restriction to the eddy current generation in the lamellar conductors, whilst, on the other part, the electromagnetic interaction efficiency is not appreciably reduced.

According to a feature of the invention, such a spreading of the magnetic field fringes is obtained from a relative angular shift between the magnetic pole lumps on one side of the airgap and the magnetic pole lumps on the opposite side of the airgap.

According to a further feature of the invention, one at least of each pair of polar lumps facing across the airgap is provided with a soft magnetic annulus around a part thereof in close proximity of the airgap.

According to a further feature of the invention, the edges of part at least of the magnetic pole lumps are shaped for a progressive gradient of the magnetic flux when passing from a magnetic flux zone to a zone deprived of magnetic flux in the airgap, and, possibly, conversely.

BRIEF DESCRIPTION OF THE DRAWINGS

FIGS. 12 and 13 show a third illustrative embodiment, whereas

DETAILED DESCRIPTION

For the sake of simplicity, the description and drawings consider the illustrative case of axial airgap electrical rotating machines and polar lumps or lugs of a cylindrical shape, i.e. with circular cross-section, though obviously the invention is not limited to such illustrative machines and may be used as well in cylindrical or linear airgap machines and differently shaped polar lugs.

Figure 1:
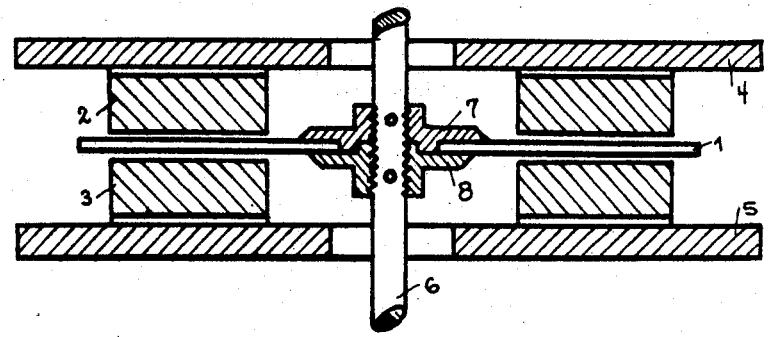
FIG. 1 shows a cross-sectional view of the main components of an electrical rotary machine of the kind concerned in the present invention.

In the illustrated embodiment of FIG. 1, the flat annular magnetic airgap, which is axial with respect to the shaft, is defined by two sets of permanent magnet poles such as shown at 2 and 3, arranged in two rings with alternate denominations of poles, south and north poles, in each ring and with opposite denomination poles facing from one ring to the other one.

Each set of magnetic poles is carried over a magnetic yoke plate, 4 for the ring of poles 2, 5 for the ring of poles 3.

Figure 3:
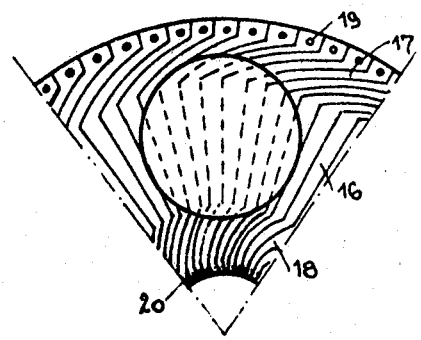
FIG. 3 shows a partial view of one face of a lammelar conductor winding passing under a magnetic polar lug, illustratively of a round shape.

Within such an airgap is located a disc-shaped rotor armature 1 secured on a rotating shaft 6 by means, for instance, of a two-part hub, said parts 7 and 8 serrating the disc along an annulus surrounding its central circular aperture; said parts thread on one another and one of them is pinned to the shaft. Obviously, as usual, at least one pair of brushes will be applied to the armature. The armature disc essentially comprises a lamellar conductor winding with at least two layers of such conductors suitably interconnected by their ends from layer to layer to complete the electrical circuit of the winding. Such layers are relatively insulated but one of the outer layers is bare on part at least of its conductors so that said part duly operates as a commutator for the brushes. A partial view of such a lamellar conductor winding is shown in FIG. 3 at a time instant it passes under one of the magnetic poles of the field inductor structure. As shown, each lamellar conductor, which is a half-turn in the winding, includes a substantially radial mid-portion 16 extended by slanted portions 17 and 18 ending in tab terminals 19 and 20. Design and manufacture of such windings are presently well known in the art.

Figure 4:
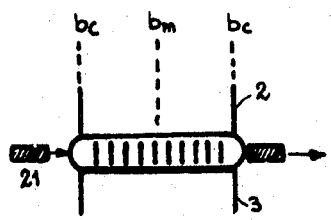
FIGS. 4 and 5 show graphs for easing the explanation of the invention.
Figure 5:
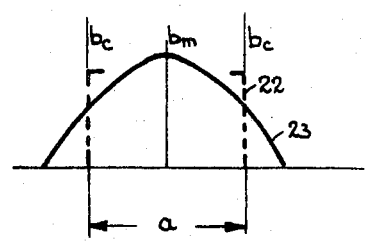

In a machine having a conventional field inductor structure, each lamellar conductor which, at a speed imparted to it by the rotation of the machine, reaches a magnetic flux zone between two pole pieces such as 2 and 3 in FIG. 4, wherein such conductor is shown at 21 and moves in the direction of the arrows, suddenly passes from a zone deprived of magnetic field to a zone having concentrated magnetic flux lines of substantially uniform distribution throughout so that the value of the magnetic induction is substantially constant from edge to edge $b_c$—$b_c$ of said zone for any intermediate location, such as $b_m$, between said edges. As the fringes of the magnetic flux are quite small, the transition is sudden. The reverse is true when the conductor escapes the magnetic flux zone, of a width $a$ for instance, see the graph of FIG. 5. In FIG. 5, the dot lines such as 22 show the unvariance of the magnetic induction in such a conventional design as in FIG. 4. Consequently, as said, high value eddy currents are generated in the lamellar conductor.

If, on the other hand and as indicated in full line at 23 in FIG. 5, the variation of distribution of the magnetic induction were substantially sine function or a similar one, wider than the span $a$ of the material pole pieces, the transitions between no field and field would be obviously smoothed and consequently the generated eddy currents would be importantly reduced in any and all of the conductors of the winding.

It is the object of the invention to more particularly provide field inductor structures for electrical rotating machines with lamellar conductor windings, that produce in the magnetic field zones of the airgap, magnetic flux distributions similar or neighbouring the one shown at 23 in FIG. 5, and to further provide such structures wherefrom such patterns are obtained from an important spreading of the magnetic flux fringes at the edges of such zones wherein, on the other part, sufficiently high values of magnetic induction will be retained for ensuring a satisfactorily high electromagnetic and electrodynamic efficiency in the cooperation of some field structures with lamellar conductor winding armatures.

Figure 2:
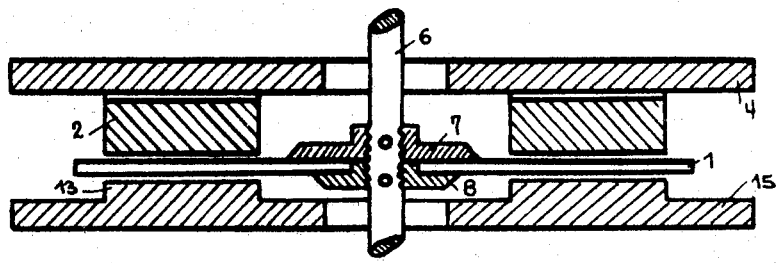
FIG. 2 shows another cross-sectional view of the main components of another electrical rotating machine of the same kind, embodying a modification easing the reduction to practice of the invention.

When, as illustrated in FIG. 1, the machine includes two sets of active magnetic poles, one set on one side of the airgap, embodiments according to the invention will be plainly apparent. When, on the other hand, only one set of active magnet poles is arranged on one side only of the airgap, as shown by magnets such as 2 in FIG. 2, a magnetic flux return plate on the other side of the airgap, as shown at 15, must be shaped with protruding lugs such as 13 facing the magnets 2, in conditions which will be herein later defined.

Figure 7:
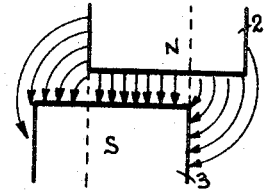
Figure 8:
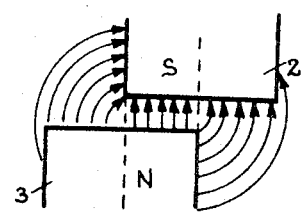

The first and main feature of an inductor field structure according to the invention, the simpler and more economical one, consists of imparting a relative angular shift between the two sets of magnetic "polar" lumps from one side of the airgap to the other one; whether or not one set of such lumps is made of active magnets or electromagnets, as the case may be. Such a relative shift ensures a substantial spreading of the magnetic flux fringes, as apparent from the views of FIGS. 7 and 8. Said figures exemplify two values of the shift: one-third for FIG. 7, one-half for FIG. 8, such values not being limitative in themselves of the possibilities of embodiment of this feature of the invention, i.e. any intermediate value may be used, as well as slightly lower and outpassing values.

It must be noted that the spreading of the fringes of the magnetic flux lines is only necessary in each direction along which a part of a lamellar conductor comes in and out of a magnetic field zone of the airgap (whether the conductors rotate with respect to the field structure or the field structure rotates with respect to the lamellar conductors).

Figure 6:
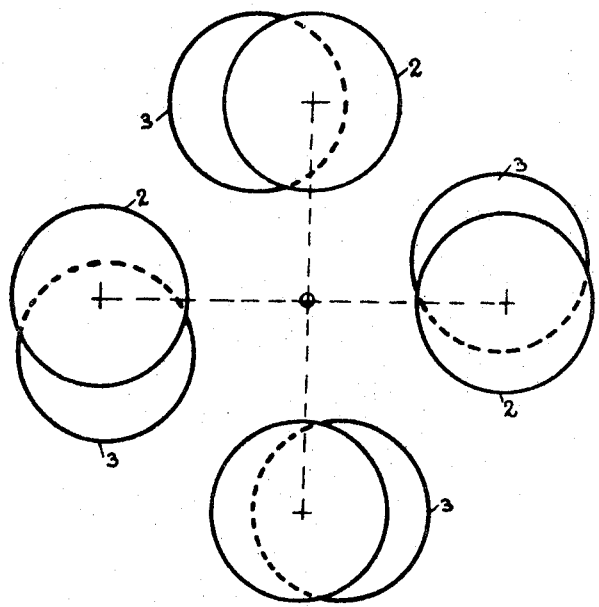
FIG. 6, in a partial top view, and FIGS. 7 and 8, in profile views, show a first illustrative embodiment according to the invention.

FIG. 6 illustratively shows a four magnetic field zone arrangement comprising two sets of cylindrical magnets 2 and 3. The magnets 2 are arranged with their centres uniformly spaced by one-fourth of a circumference, and so are the magnets 3; however, as apparent, a relative angular shift is provided from one set of magnets to the other one. When estimated necessary, some radially orientated shift may further be imparted between the two sets of magnets in addition to their circumferentially orientated shift which gives the sought result as seeable in FIGS. 7 and 8. The flux lines in said figures are only qualitatively indicated in order to visualize the spreading of the fringes near the edges of the magnetic field zone proper delimitated by the facing areas of the magnets. In such examples as in the following ones, results are the same when, to magnets 3 are substituted magnetic inactive lumps such as 13. Obviously, the cross-sections of the magnets and/or lumps are not necessarily circular but of any required other shape.

Figure 9:
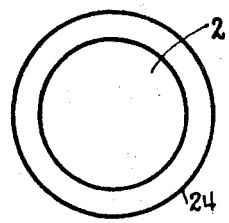
FIG. 9, in a top view, and FIG. 10, in a side view, show a second example of embodiment of the invention.
Figure 10:
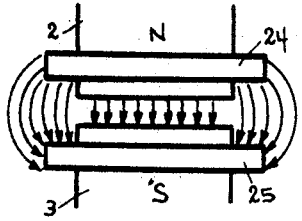
Figure 11:
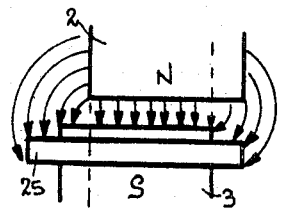
FIG. 11 shows a modification of FIG. 10.

According to another feature of the invention, each magnet and/or magnetic lump of the field structure or part of them only with respect to the airgap is provided, near its end area facing the airgap, with a soft magnetic ring such as shown at 24, FIG. 9, around a magnet 2. FIG. 10 shows the arrangement in which, further to ring 24 around magnet 2, an identical ring 25 is placed around magnet 3. The resulting spreading of the magnetic fringes are illustrated in said FIG. 10. Such a magnetic ring arrangement may be advantageously combined with the above described relative shift such, for instance, as shown in FIG. 11. In said example, not limitative per se, only magnet 3 is provided with a magnetic material ring 25 but magnet 2 is relatively shifted with respect to magnet 3 though with a degree lower than in the example of FIG. 7. The advantage of such a combination lies in the fact that a more important part of the areas of 2 and 3 (it could be 13) register from one side to the other side of the airgap and consequently, the reduction of electromagnetic efficiency is less than in the case of FIG. 7 or FIG. 8 though such a reduction is quite acceptable in the simpler case.

Now, in certain conventional arrangements of magnetic field structures for electrical rotating machines, it was proposed to shape the poles near their vicinity to the airgap so as to better concentrate the magnetic field in zones of restricted width than the cross-section of the pole pieces. However, such arrangements were made such that the fringes were actually reduced: for instance, the concentration was obtained by shaped lumps of soft magnetic material glued under the magnets proper. On the other hand, a feature of the invention provides for a shaping of the magnets and lumps as moulded or otherwise machined in the mass itself of the magnetic material. The shaping may be bevelling as in FIG. 12 or merely rounding off, as in FIG. 13, and it may be provided only in one of each pairs of magnets and lumps, as shown in FIG. 14, it is so made anyway that it results in a substantial spreading of the fringes of the magnetic flux lines, as apparent.

Said last described feature may be mainly used as an auxiliary to the first described one, i.e. the relative shift between the facing areas of the magnets and/or lumps.

Certain examples of such embodiments are shown in FIGS. 14 to 17.

Figure 14:
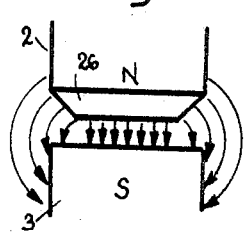
FIGS. 14 and 17 show varied combinations of said third embodiment with the two first ones.

In FIG. 14, the shift is ensured, both edges, by shaping only one magnet, 2 for instance, in each pair as shown at 26. The two edges of the airgap surface of magnet 3 are consequently "shifted" with respect to the edges of the bevelled part of magnet 2, hence the spreading of the fringes and the eddy current reduction.

Figure 15:
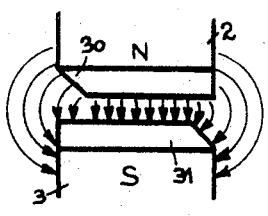
Figure 16:
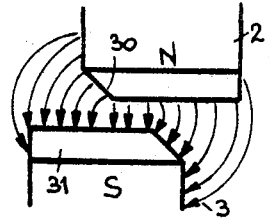

In FIG. 15, the shapes given to the airgap end portions of the magnets are such that the areas are actually shifted relatively to one another in the airgap: the left hand part of 2 is bevelled whereas it is the right-hand part of 3 which is bevelled, hence the relatively shifted facing areas through the airgap. FIG. 16 is a modification based on the scheme of FIG. 15 plus an actual shift of the whole of one magnet with respect to the other one. In each figure, the shaped part of 2 is shown at 30 and the shaped part of 3 is shown at 31.

Figure 12:
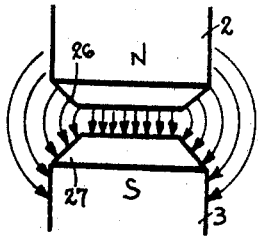
Figure 13:
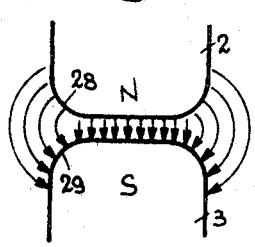
Figure 17:
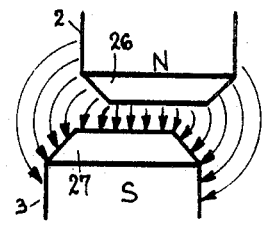

FIG. 17 is a modification of FIG. 12 in which the two cooperating magnets present an actual relative extra shift.

When the winding armature is fixed and the field structure rotates, the two parts of the field structure are both secured to the rotating shaft. The term "rotating" must be understood as including oscillating and step-by-step movements.

When applied to rotating machines of the cylindrical airgap type, the armature is of cup-shaped kind and the two sets of poles and lumps of the field structure are mounted concentrically.

The invention may further receive applications in the field of linear airgap machines wherein the armature is of substantially flat elongated shape and passes, on part at least of its greater dimension length, between the two sets of pole pieces and lumps which are themselves linearly arranged.

What is claimed is:
1. Electrical rotating machine comprising:
 (a) an armature winding member made of lamellar conductors,
 (b) a magnetic field inductor structure comprised of two members defining a magnetic airgap wherein a plurality of magnetic flux zones regularly alternate with a corresponding plurality of zones which are substantially deprived of magnetic field,
   said armature winding lamellar conductors travelling in said airgap through said magnetic flux zones during the relative displacement of said armature winding member and said magnetic field inductor structure,
   wherein each one of the two members of said magnetic field inductor structure comprises for defining such magnetic flux zones a corresponding plurality of protruding magnetic material lumps, said lumps substantially facing one another from one of the said members to the other one through said magnetic airgap,
   and means for establishing substantial fringing of the magnetic flux in the airgap between corresponding pairs of said magnetic material lumps and in the general direction of travel of said lamellar conductors in the airgap.

2. Electrical rotating machine according to claim 1, wherein the edges of said lumps in each one of said pairs are relatively shifted in said direction.

3. Electrical rotating machine according to claim 2 wherein the cross-sections of said lumps are substantially identical and the two members comprising said lumps are relatively angularly shifted.

4. Electrical rotating machine according to claim 3 wherein further said two members are relatively shifted in a direction transverse to the first one.

5. Electrical rotating machine according to claim 2 wherein one of said lumps in each pair is tapered in the vicinity of the airgap.

6. Electrical rotating machine according to claim 2 wherein one of said lumps in each pair is of a cross-section reduced with respect to the cross-section of the other lump of the pair.

7. Electrical rotating machine according to claim 2 wherein the lumps of each pair are asymetrically tapered in the said direction in the vicinity of the airgap.

8. Electrical rotating machine according to claim 2 wherein one of said lumps of each pair is surrounded by a soft magnetic material ring in the vicinity of the airgap.

9. Electrical rotating machine according to claim 1 wherein the cross-sections of said lumps are tapered in the vicinity of the airgap.

10. Electrical rotating machine according to claim 1 wherein said lumps are each surrounded by a soft magnetic material ring in the vicinity of the airgap.

References Cited

UNITED STATES PATENTS

| | | | |
|---|---|---|---|
| 3,293,466 | 12/1966 | Henry-Baudot | 310—268 XR |
| 3,077,548 | 2/1963 | Moressee et al. | 310—268 XR |
| 3,230,408 | 1/1966 | Henry-Baudot | 310—268 |
| 3,072,814 | 1/1963 | Moressee et al. | 310—268 |
| 3,171,051 | 2/1965 | Burr | 210—268 |
| 1,897,184 | 2/1933 | Zopp | 310—268 XR |
| 1,689,188 | 10/1928 | Pohl et al. | 310—256 |
| 3,311,767 | 3/1967 | Faulkner | 310—268 XR |
| 3,081,412 | 3/1963 | Granieu | 310—254 XR |
| 2,371,268 | 3/1945 | Scofield | 310—254 |

FOREIGN PATENTS

| | | |
|---|---|---|
| 786,744 | 11/1957 | Great Britain. |
| 219,703 | 2/1962 | Austria. |
| 1,140,332 | 1/1969 | Great Britain. |
| 1,338,999 | 8/1963 | France. |
| 1,330,344 | 5/1963 | France. |
| 1,275,900 | 10/1961 | France. |

MILTON O. HIRSHFIELD, Primary Examiner

B. A. REYNOLDS, Assistant Examiner

U.S. Cl. X.R.
310—254, 269